US012777356B2

(12) United States Patent
Åberg et al.

(10) Patent No.: US 12,777,356 B2
(45) Date of Patent: Oct. 27, 2026

(54) COMPUTER SOFTWARE MODULE APPARATUS, A CIRCUITRY APPARATUS, AN APPARATUS AND A METHOD FOR AN IMPROVED MONITORING OF ENERGY EFFICIENCY OF A RADIO UNIT

(71) Applicant: Telefonaktiebolaget LM Ericsson (publ), Stockholm (SE)

(72) Inventors: Patrik Åberg, Lund (SE); Peter Nessrup, Åkarp (SE); Marcus Törndahl, Skegrie (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 379 days.

(21) Appl. No.: 18/561,647

(22) PCT Filed: May 21, 2021

(86) PCT No.: PCT/EP2021/063661
§ 371 (c)(1),
(2) Date: Nov. 16, 2023

(87) PCT Pub. No.: WO2022/242877
PCT Pub. Date: Nov. 24, 2022

(65) Prior Publication Data

US 2024/0267773 A1 Aug. 8, 2024

(51) Int. Cl.
*H04W 24/10* (2009.01)
*H04W 52/06* (2009.01)

(52) U.S. Cl.
CPC ........... *H04W 24/10* (2013.01); *H04W 52/06* (2013.01)

(58) Field of Classification Search
CPC .............................. H04W 24/10; H04W 52/06
See application file for complete search history.

(56) References Cited

U.S. PATENT DOCUMENTS

| | | | | |
|---|---|---|---|---|
| 8,774,792 | B2 * | 7/2014 | Deng | H04W 24/10<br>455/423 |
| 11,252,672 | B1 * | 2/2022 | Nuvvula | H04W 24/10 |

(Continued)

FOREIGN PATENT DOCUMENTS

| | | | |
|---|---|---|---|
| CN | 108446555 | A | 8/2018 |
| EP | 2 919 531 | A1 | 9/2015 |
| WO | 2021/002966 | A1 | 1/2021 |

OTHER PUBLICATIONS

International Search Report and Written Opinion issued in International Application No. PCT/EP2021/063661 Feb. 8, 2022 (10 pages).

(Continued)

*Primary Examiner* — Duc C Ho
(74) *Attorney, Agent, or Firm* — Rothwell, Figg, Ernst & Manbeck, P.C.

(57) ABSTRACT

A method for use in Radio Access Network, the method comprising: storing one or more configurations along with expected power characteristics for the one or more configurations; receiving a power measurement report, wherein the power measurement report indicates one configuration out of the one or more configurations and a corresponding measured power characteristics for a Radio Access Network radio unit; determining whether the measured power characteristics corresponds to the expected power characteristics of the indicated configuration, and if so verifying the configuration; and if not so issuing a warning.

18 Claims, 6 Drawing Sheets

(56) References Cited

U.S. PATENT DOCUMENTS

| | | | | |
|---|---|---|---|---|
| 11,595,286 | B2 * | 2/2023 | Ramamurthi | H04B 17/309 |
| 2006/0123807 | A1 * | 6/2006 | Sullivan | G01D 4/004<br>62/129 |
| 2011/0007491 | A1 * | 1/2011 | Robinson | H02J 7/485<br>361/810 |
| 2016/0078347 | A1 | 3/2016 | Salajegheh et al. | |
| 2019/0202414 | A1 * | 7/2019 | Shih | B60L 53/66 |

OTHER PUBLICATIONS

Umar, M. et al., "Prometheus: Coherent Exploration of Hardware and Software Optimizations using Aspen", 2018 IEEE (7 pages).

Carvalho, S. A. L. et al., "Identifying Power Consumption Signatures in LTE Conformance Tests using Machine Learning", 2018 IEEE (4 pages).

* cited by examiner

COMPUTER SOFTWARE MODULE APPARATUS, A CIRCUITRY APPARATUS, AN APPARATUS AND A METHOD FOR AN IMPROVED MONITORING OF ENERGY EFFICIENCY OF A RADIO UNIT

CROSS REFERENCE TO RELATED APPLICATIONS

This application is a 35 U.S.C. § 371 National Stage of International Patent Application No. PCT/EP2021/063661, filed 2021 May 21.

TECHNICAL FIELD

The teachings herein relates to an apparatus, an apparatus comprising computer software modules, an apparatus comprising circuits, a device and a method for providing an improved monitoring of energy efficiency, and in particular to an apparatus, an apparatus comprising computer software modules, an apparatus comprising circuits, a device and a method for providing an improved monitoring of energy efficiency of a radio unit.

BACKGROUND

Contemporary devices such as smartphones, tablet computers, wearables (watches for example) are becoming more and more advanced providing more and more functionalities to users and draining more and more power. At the same time, with the growth of Internet of Things and with the recent year's trends in automation, more and more devices are arranged as radio units for communicating with other radio units and/or servers. In most of these applications the size and weight are of importance as well as the battery lifetime. It is thus important to provide for an energy efficient operation of these radio units. Furthermore, it is of importance to the whole planet that energy is conserved.

As is known, cellular radio networks consist of thousands of nodes, each node with multiple sectors and cells. For each cell, there is one or several transmitting radio devices or radio units.

Each network node can be deployed or configured with several different software releases, have thousands of parameters and hundreds of licensed features, where each feature may have unique settings. Furthermore, the hardware components in the radio network can be deployed using several different hardware variants, using different revisions of hardware, including different hardware components for specific usage requirements such as relating to frequency bands, bandwidth, output power, branches, and Radio Access Technologies to mention a few examples. Such RAN (Radio Access Networks) cellular networks consumes a lot of energy and at least one of the major contributors to the energy consumption are the RAN node radio units.

In order to reduce the power consumption of RAN networks, there have been proposed numerous functions and settings that are aimed at lowering the power consumption of the radio unit and thus also lower the energy consumption and the overall energy footprint of the complete RAN network. For example, RAN energy-saving software features may be optimized for a RAN system, and may help operators to significantly reduce energy consumption of the RAN system (or network).

However, as mentioned above, a RAN system comprises several thousands of radio units, each running multiple software versions, and on multiple hardware versions each with multiple options available. Finding one feature that saves energy in the most optimum manner may thus be a huge task and nearly impossible on a design level as it will be nearly impossible to predict what functions, running on what software versions and hardware versions will be executed at the same (future) time.

Supervision of the network and energy efficiency features, to see if it works as expected for a given combination of energy efficient features, is done by a backend RAN control system, using a collection of counters, supplied by the baseband units, along with the known configuration of the nodes. Key Performance Indicators, based on the counter values are defined and tracked, which counter values may be feature and/or function specific. Due to the vast number of devices and functions involved it is extremely hard to understand if the complete network or a specific transmitting radio unit is behaving as expected with the current configuration and the enabled energy efficiency features, or what kind of faults there might be and where the faults are. The impact on the radio network or a specific transmitting radio unit is also very difficult to predict when changing parameters, configuration settings or altering licensed features.

There is thus a need for an improved manner of monitoring a RAN network.

SUMMARY

An object of the present teachings is to overcome or at least reduce or mitigate the problems discussed in the background section. The inventors have realized that a neural network can be trained to identify whether an energy efficiency feature is active or not based on power measurements of a radio unit. The power measurements are generated by measuring power characteristics over time at time intervals thereby generating a time series of power measurements. The power measurements are in some embodiments made at the power amplifier. The power measurements are made for given configurations of energy efficiency features and the neural network is trained based on these measurements.

The inventors have realized that even though the internal workings of a radio unit are very complicated and difficult to monitor, the power output at the power amplifier is at least easy to monitor. And that, by building up a large data library of power measurements mapped to specific configurations, a neural network is able to identify whether a feature is active or not, or working properly.

According to a first aspect a computing device is provided, the computing device comprising a controller, and being connected to a memory, wherein the memory is configured to store one or more configurations along with expected power characteristics for the one or more configurations, and wherein the controller is configured to: receive a power measurement report, wherein the power measurement report indicates one configuration out of the one or more configurations and a corresponding measured power characteristics for a Radio Access Network radio unit; determine whether the measured power characteristics corresponds to the expected power characteristics of the indicated configuration, and if so verify the configuration; and if not so issue a warning.

The solution may be implemented as a software solution, a hardware solution or a mix of software and hardware components.

In some embodiments the controller is further configured to determine whether the measured power characteristics corresponds to the expected power characteristics of the indicated configuration utilizing a neural network.

In some embodiments the neural network is trained to associate a power characteristics with one or more Energy Efficiency Features in a configuration.

In some embodiments the controller is further configured to determine whether the measured power characteristics corresponds to the expected power characteristics of the indicated configuration by identifying candidate Energy Efficiency Features based on the measured power characteristics and determining if the candidate Energy Efficiency Features matches the Energy Efficiency Features of any of the one or more stored configurations and if so determine whether the configuration having the matching Energy Efficiency Features is the indicated configuration, and if so determine that the measured power characteristics corresponds to the expected power characteristics of the indicated configuration.

In some embodiments the controller is further configured to store the measured power characteristics as the expected power characteristics of the indicated configuration in response to determining that the measured power characteristics does not correspond to the expected power characteristics of the indicated configuration.

In some embodiments the controller is further configured to determine whether the indicated configuration is not stored in the memory, and if so, store the indicated configuration in the memory along with the measured power characteristics as the expected power characteristics of the indicated configuration in response to determining that the measured power characteristics does not correspond to the expected power characteristics of the indicated configuration.

In some embodiments the controller is further configured to select a new configuration from the one or more stored configurations for the Radio Access Network radio unit in response to determining that the measured power characteristics does not correspond to the expected power characteristics of the indicated configuration.

In some embodiments the controller is further configured to retrain the neural network based on the determination whether the measured power characteristics corresponds to the expected power characteristics of the indicated configuration.

In some embodiments the controller is further configured to receive the neural network.

In some embodiments the neural network is trained based on power measurements obtained from RAN node radio units used in a laboratory environment.

In some embodiments the power measurement report is an aggregated power measurement report for a plurality of RAN radio units.

According to a second aspect a server comprising a computing device according to herein is provided. In some embodiments the server is comprised in a cloud service.

In some embodiments the server comprises the memory. In some embodiments the controller is further configured to receive the power measurement report from a Radio Access Network Radio Control Unit.

According to one aspect a RAN radio control unit comprising a controller is provided, the RAN radio control unit being connected to a computing device according to herein, and wherein the controller is configured to receive the power measurement report and forward it to the Computing device.

In some embodiments the controller is configured to receive the power measurement report from a RAN baseband unit and forward it to the computing device.

In some embodiments the RAN radio control unit is connected to the computing device by comprising the computing device, the controller of the computing device being the controller of the RAN radio control unit.

According to a third aspect a RAN baseband unit comprising a controller is provided, wherein the controller is configured to receive a plurality of power measurements for one or more RAN radio units for a configuration utilized by the one or more RAN radio units and to aggregate the plurality of power measurements into an aggregated power measurement report, and to transmit the aggregated power measurement report to a RAN radio control unit.

According to a fourth aspect a RAN radio unit comprising a controller is provided, wherein the controller is configured to measure a plurality of power characteristics of the RAN radio unit during a time period and transmit the plurality of power characteristics of the RAN radio unit as a measured power characteristics to a RAN baseband unit.

In some embodiments the RAN radio unit further comprises a power amplifier and wherein the controller is configured to measure the plurality of power characteristics of the RAN radio unit during the time period by measuring a power of the power amplifier at time intervals.

According to a fifth aspect there is provided a method for use in Radio Access Network, the method comprising: storing one or more configurations along with expected power characteristics for the one or more configurations; receiving a power measurement report, wherein the power measurement report indicates one configuration out of the one or more configurations and a corresponding measured power characteristics for a Radio Access Network radio unit; determining whether the measured power characteristics corresponds to the expected power characteristics of the indicated configuration, and if so verifying the configuration; and if not so issuing a warning.

According to a sixth aspect there is provided a computer-readable medium carrying computer instructions that when loaded into and executed by a controller of a computing device enables the computing device to implement a method according to herein.

According to a seventh aspect there is provided a software component apparatus for a computing device, wherein the software component apparatus comprises: a software component for storing one or more configurations along with expected power characteristics for the one or more configurations; a software component for receiving a power measurement report, wherein the power measurement report indicates one configuration out of the one or more configurations and a corresponding measured power characteristics for a Radio Access Network radio unit; a software component for determining whether the measured power characteristics corresponds to the expected power characteristics of the indicated configuration; a software component for verifying the configuration if the measured power characteristics corresponds to the expected power characteristics of the indicated configuration; and a software component for issuing a warning if the measured power characteristics does not correspond to the expected power characteristics of the indicated configuration.

According to an eighth aspect there is provided a computing device comprising: circuitry for storing one or more configurations along with expected power characteristics for the one or more configurations; circuitry for receiving a power measurement report, wherein the power measurement report indicates one configuration out of the one or more configurations and a corresponding measured power characteristics for a Radio Access Network radio unit; circuitry for determining whether the measured power characteristics corresponds to the expected power characteristics of the indicated configuration; circuitry for verifying the configuration if the measured power characteristics corresponds to the expected power characteristics of the indicated configuration; and circuitry for issuing a warning if the measured power characteristics does not correspond to the expected power characteristics of the indicated configuration.

In some embodiments, the second, third, fourth, fifth, sixth, seventh and eighth aspects may additionally have features identical with or corresponding to any of the various features as explained above for the first aspect.

For the context of the teachings herein, a software component may be replaced or supplemented by a software module.

The teachings herein enables for identifying the proper working of energy efficiency features and settings.

The teachings herein also enables for detecting if there are other unknown interaction dependencies that is impacting the energy efficiency features.

The teachings herein also enables for detecting if there are any problems with the software/hardware of RAN radio unit(s).

The teachings herein also greatly reduces the complexity of identifying the proper working of energy efficiency features.

Further embodiments and advantages of the teachings herein will be given in the detailed description. It should be noted that the teachings herein find use in smartphones, smartwatches, tablet computers, media devices, and even in vehicular displays.

BRIEF DESCRIPTION OF THE DRAWINGS

Embodiments of the invention will be described in the following, reference being made to the appended drawings which illustrate non-limiting examples of how the inventive concept can be reduced into practice.

DETAILED DESCRIPTION

Figure 1:
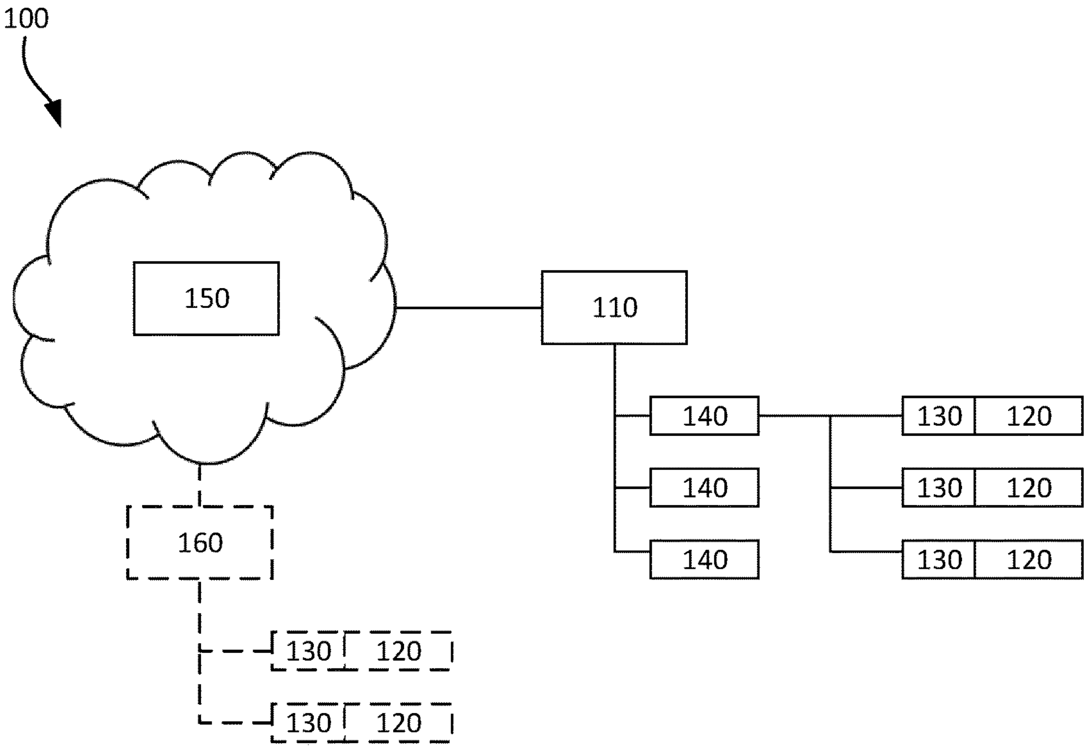
FIG. 1 shows a schematic view of a RAN system according to some embodiments of the teachings herein.

FIG. 1 shows a schematic view of a RAN system or network 100 according to some embodiments of the teachings herein. The RAN network 100 comprises one or more RAN control units 110. It should be noted that only one RAN control unit 110 is shown in FIG. 1, but a RAN network may comprise more than one RAN control unit 110. The RAN control unit 110 is connected to a plurality of baseband units 140, which in turn are configured to serve a cell and any and all radio units 120 that are within that cell.

The RAN control unit 110 of the current application is also operationally connected to a server 150. By operationally connected it is meant that the RAN control unit 110 can be wirelessly connected to the server, or connected by a wire. It also means that it can be disconnected to the server as well as being reconnected to the server when operation demands so. In some embodiments, the server 150 is provided as a cloud service. In some embodiments, the server 150 is provided as one or more dedicated services or servers. In some embodiments, the server 150 is provided as an internal server or software module for the RAN control unit.

The RAN radio units 120 are arranged with a power measuring device 130 that is arranged to measure the power characteristics of the RAN radio unit 120. In some embodiments the power measuring device 130 is arranged to measure the power characteristics of the RAN radio unit 120 at the antenna and/or power amplifier for the antenna (both hereafter seen as being part of the power amplifier of the RAN radio unit 120).

In some embodiments the power characteristics show the nature of or different distributions of the individual samples in a series of power measurement samples.

In some embodiments the RAN radio unit 120 is connected to the power measurement device 130. In some embodiments the RAN radio unit 120 comprises the power measurement device 130.

The RAN radio unit 120 in combination with the power measuring device 130 is arranged to measure the power characteristics of the RAN radio unit 120 and to do so over time. In some embodiments the power is measured at instances thereby providing a series of measurements of the power applied to (i.e. power provided to and utilized by the power amplifier), provided to (i.e. power fed to the amplifier) or applied by (i.e. power utilized by) the power amplifier.

The RAN radio control unit 110, the RAN baseband unit 140 and the RAN radio unit 120 are all examples of RAN nodes.

Figure 2A:
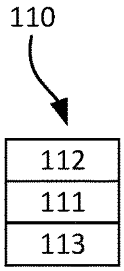
FIG. 2A shows a schematic view of a RAN radio control unit according to some embodiments of the teachings herein.

FIG. 2A shows a schematic view of a RAN radio control unit 110 according to some embodiments of the teachings herein. The RAN radio control unit 110 comprises a controller 111, a memory 112 and a communication interface 113.

The controller 111 is configured to control the overall operation of the RAN radio control 110 unit 110. The memory 112 is configured to store configurations, settings and computer-readable instructions that when loaded into the controller 111 indicates how the RAN radio control unit 110 is to be controlled.

In some embodiments a configuration is a collection of settings, features, parameters and/or licenses that result in specific power characteristics.

In some such embodiments a configuration indicates which energy efficiency features that are to be utilized. Examples of such energy efficiency features are to automatically deactivate not required capacity during low and medium traffic loads. By performing advanced measurements, that predict traffic patterns, traffic load, and end-user needs, from cell down to subframe levels, it is possible to dynamically activate and deactivate radio devices, based on such data, to achieve the lowest possible energy consumption with maintained network performance.

The communication interface 113 is arranged to enable communication with the server 150 and the base band units 140. The communication interface 113 may be wired and/or wireless. The communication interface may comprise several interfaces. The communication interface 113 comprises a radio frequency (RF) communications interface according to a radio Access Technology of the RAN network 100.

Figure 2B:
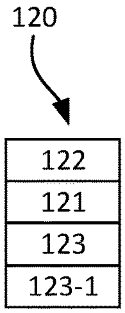
FIG. 2B shows a schematic view of a RAN radio unit according to some embodiments of the teachings herein.

FIG. 2B shows a schematic view of a RAN radio unit 120 according to some embodiments of the teachings herein. The RAN radio unit 120 comprises a controller 121, a memory 122 and a communication interface 123.

The controller 121 is configured to control the overall operation of the RAN radio unit 120. The memory 122 is configured to store configurations, settings and computer-readable instructions that when loaded into the controller 121 indicates how the RAN radio unit 120 is to be controlled.

The communication interface 123 is arranged to enable communication with the base band unit 140. In some embodiments, the communication interface 123 is further configured to enable communication with the power measurement devices 130. For example, in embodiments where the RAN radio unit 120 does not comprise the power measurement device 130. The communication interface 123 may be wired and/or wireless. The communication interface may comprise several interfaces. The communication interface 123 comprises a radio frequency (RF) communications interface according to a radio Access Technology of the RAN network 100. The communication interface comprises a power amplifier 123-1.

Figure 2C:
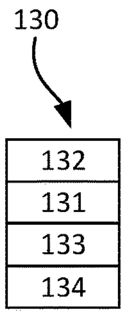
FIG. 2C shows a schematic view of a power measurement device according to some embodiments of the teachings herein.

FIG. 2C shows a schematic view of a power measurement device 130 according to some embodiments of the teachings herein. The power measurement device 130 comprises a controller 131, a memory 132 and a communication interface 133.

The controller 131 is configured to control the overall operation of the power measurement device 130. The memory 132 is configured to store configurations, settings and computer-readable instructions that when loaded into the controller 131 indicates how the power measurement device 130 is to be controlled.

The communication interface 133 is arranged to enable communication with the Radio unit 120 and/or the RAN baseband unit 140. The communication interface may comprise several interfaces. The communication interface 133 comprises a radio frequency (RF) communications interface according to a radio Access Technology of the RAN network 100.

In embodiments where the RAN radio unit 120 comprises the power measurement device 130, the controller 131, the memory 132 and the communication interface 133 of the power measurement device 130 may be the controller 121, the memory 122 and the communication interface 123 of the RAN radio unit 120.

The power measurement device 130 is arranged to measure or receive indications of the power of the power amplifier 123-1 of the RAN radio unit 120.

Figure 2D:
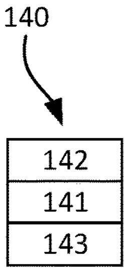
FIG. 2D shows a schematic view of a RAN baseband unit according to some embodiments of the teachings herein.

FIG. 2D shows a schematic view of a RAN baseband unit 140 according to some embodiments of the teachings herein. The baseband unit 140 comprises a controller 141, a memory 142 and a communication interface 143.

The controller 141 is configured to control the overall operation of the RAN baseband unit 140. The memory 142 is configured to store configurations, settings and computer-readable instructions that when loaded into the controller 141 indicates how the RAN baseband unit 140 is to be controlled.

The communication interface 143 is arranged to enable communication with the Radio control unit 110 and the RAN radio units 120. The communication interface may comprise several interfaces. The communication interface 143 comprises a radio frequency (RF) communications interface according to a radio Access Technology of the RAN network 100.

Figure 2E:
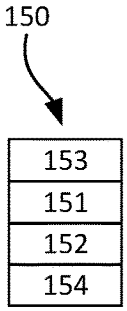
FIG. 2E shows a schematic view of a server according to some embodiments of the teachings herein.

FIG. 2E shows a schematic view of a server 150 according to some embodiments of the teachings herein. The server 150 comprises a controller 151, a memory 152 and a communication interface 153.

The controller 151 is configured to control the overall operation of the server 150. The memory 152 is configured to store configurations, settings and computer-readable instructions that when loaded into the controller 151 indicates how the server 150 is to be controlled. The memory 152 is configured to also store a neural network 154 and a library of expected power characteristics for a configuration of energy efficiency features. In some embodiments, the neural network 154 is a convolutional neural network.

The communication interface 153 is arranged to enable communication with the RAN control unit(s) 110. The communication interface 153 may be wired and/or wireless. The communication interface may comprise several interfaces. The communication interface 153 comprises a radio frequency (RF) communications interface according to a radio Access Technology of the RAN network 100.

In embodiments where the RAN radio control unit 110 comprises the server 150, the controller 151, the memory 152 and the communication interface 153 of the server 150 may be the controller 111, the memory 112 and the communication interface 113 of the RAN radio control unit 110.

In general, and as relates to the RAN Radio control unit 110, the baseband unit 140, the server 150 and the RAN radio unit 120, the controller 111, 121, 131, 141, 151 and the memory 112, 122, 132, 142, 152 will be discussed below.

In some embodiments, the controller 111, 121, 131, 141, 151 is a general purpose controller. As a skilled person would understand, there are many alternatives for how to implement a controller, such as using Field-Programmable Gate Arrays circuits, ASIC, GPU, etc. in addition or as an alternative. For the purpose of this application, all such possibilities and alternatives will be referred to simply as the controller 111, 121, 131, 141, 151.

The memory 112, 122, 132, 142, 152 may comprise several memory units or devices, but they will typically be perceived as being part of the same overall memory 112, 122, 132, 142, 152. There may e.g. be one memory unit for image presenting device storing graphics data, one memory unit for eyewear detector storing settings, one memory for communications interface (if such is present), for storing settings, and so on. As a skilled person would understand there are many possibilities of how to select where data should be stored and a general memory 112, 122, 132, 142, 152 is therefore seen to comprise any and all such memory units for the purpose of this application. As a skilled person would understand there are many alternatives of how to implement a memory, for example using non-volatile memory circuits, such as EEPROM memory circuits, or using volatile memory circuits, such as RAM memory circuits. For the purpose of this application all such alternatives will be referred to simply as the memory 112, 122, 132, 142, 152.

Figure 3:
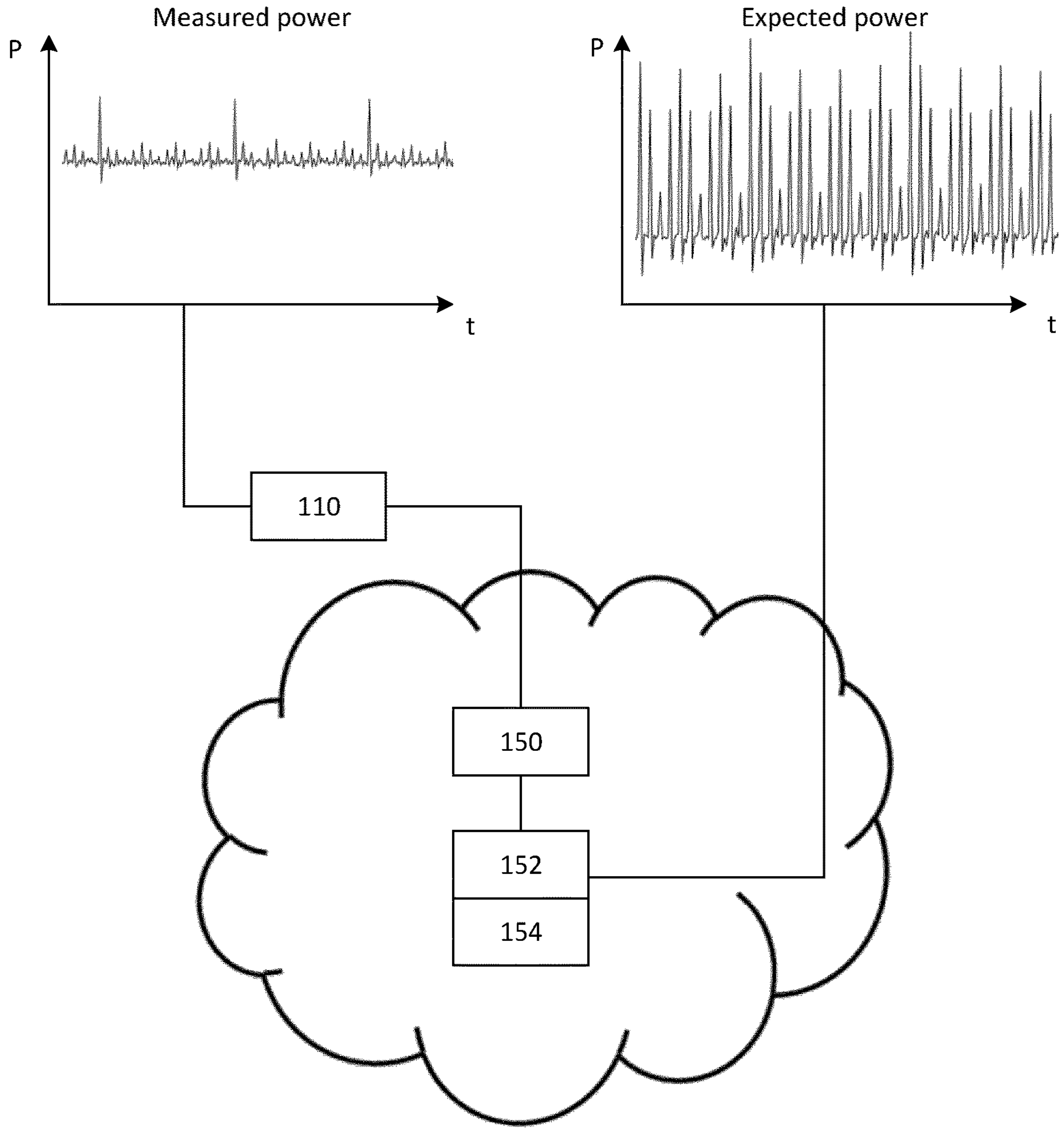
FIG. 3 shows a schematic view of how a measured power is compared to an expected power according to the teachings herein.
Figure 4:
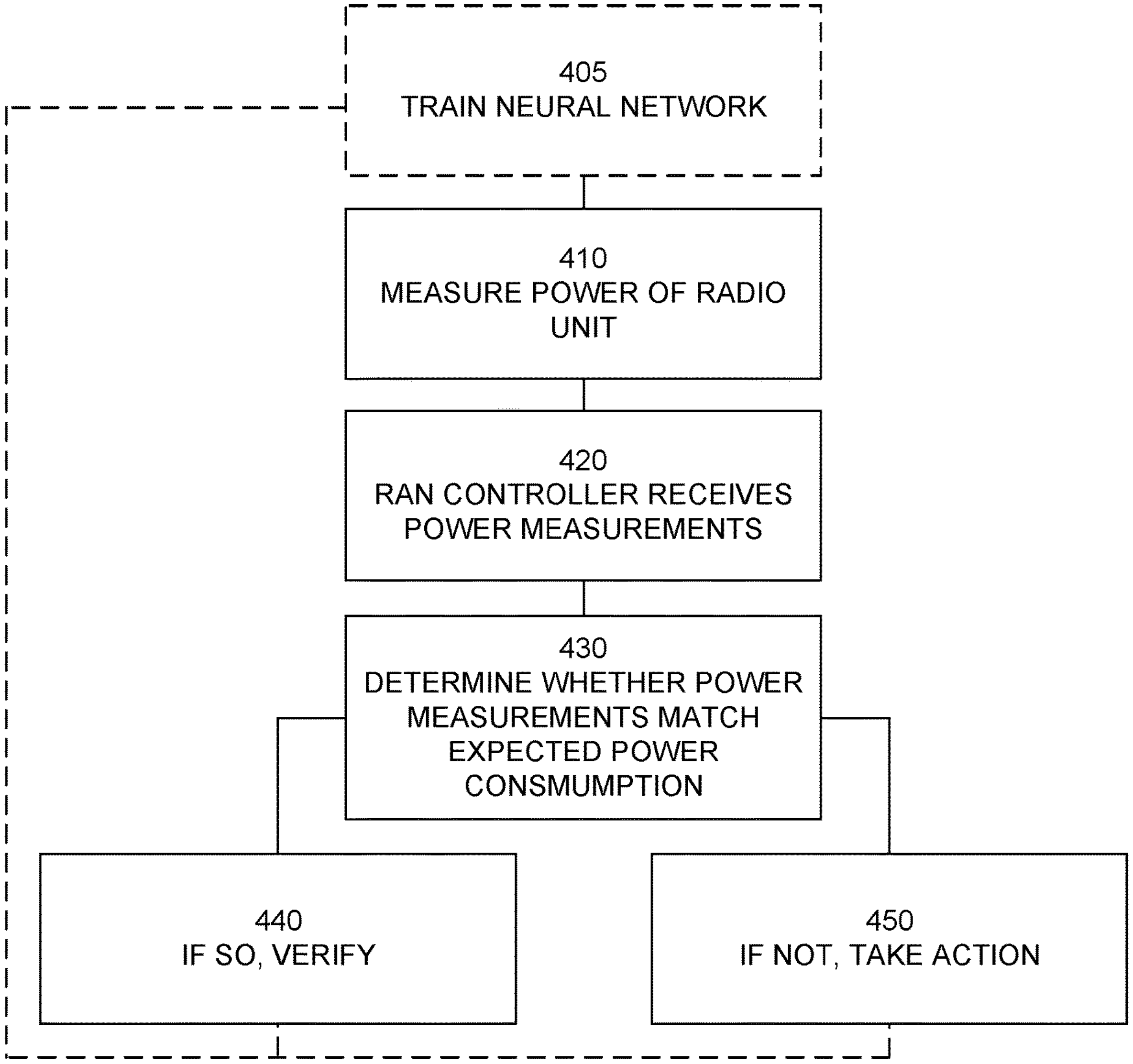
FIG. 4 shows a flowchart of a general method according to some embodiments of the teachings herein.

Returning to FIG. 1, the general operation of the RAN network 100 in large will be disclosed with simultaneous reference to FIGS. 3 and 4. FIG. 3 is a schematic view showing how a measured power characteristic(s) is compared to an expected power characteristic(s) according to the teachings herein. FIG. 4 is a flowchart for a general method according to the teachings herein.

As stated above, a configuration indicates which energy efficiency features that should be utilized during execution of a RAN radio unit 120. The energy efficiency features are software functions or algorithms that operate on several levels and affect multiple settings and which have an aggregated effect of a reduced power characteristics at a radio unit, and predominately at the power amplifier and/or antenna of the radio unit. The power characteristics of the RAN radio unit are therefore dependent on the configuration used, and a first configuration will result in first power characteristics and a second configuration will result in second power characteristics. The power characteristics are measured over time providing a series of power measurements forming a power curve.

In FIG. 3 the left graph shows such a power curve where the measured power characteristics are plotted against time.

In FIG. 3 the right graph shows the expected power characteristics plotted against time, the graph thus representing an expected power characteristics for a given configuration. The expected power characteristics is, in some examples, power characteristics measured for the given configuration in a laboratory environment 160, and in some examples, power characteristics measured for the given configuration and verified for a RAN radio unit 120 used in the field.

Both the measured power characteristics and the expected power characteristics are (each) associated with a configuration, and by comparing if there is a match between the measured power characteristics and the expected power characteristics it can be determined what configuration is used and if the configuration is working properly. In some embodiments, and as shown in FIG. 3, the measured power characteristics are received by a RAN radio control unit 110 and the RAN radio control unit 110 causes the measured power characteristics to be compared to a library of expected power characteristics that are stored in the memory 152 of the server 150 in some embodiments.

By feeding a plurality of power characteristics and the used energy efficiency features (i.e. examples of configurations) the neural network 154 can be trained to associate power characteristics with energy efficiency features.

An initial training can be done by using power characteristics achieved in the laboratory environment 160. A continuous training can be done based on power characteristics measured for the given configuration and verified for a RAN radio unit 120 used in the field.

The neural network 154 is thus enabled to associate an energy efficiency feature with power characteristics and by providing the measured power characteristics to the neural network 154, the neural network 154 is able to determine which energy efficiency features that are utilized.

In some embodiments, the energy efficiency features are determined to be utilized by identifying (individual) energy efficiency features from the measured power characteristics.

In some embodiments, the energy efficiency features are determined to be utilized by matching the measured power characteristics to an expected power characteristics and taking the energy efficiency features indicated to be active in the configuration of the matching expected power characteristics.

In some embodiments, the energy efficiency features or configuration determined to be utilized is then compared to the energy efficiency features of the configuration utilized, and if there is a match it can be determined that the energy efficiency features are working properly.

As one of the RAN radio units 120 executes and operates according to a given configuration, the power characteristics of the RAN radio unit 120 is measured 410 over time.

In some embodiments the power is measured continuously (at sample intervals). In some embodiments, the power is measured for a period(s) of time. In some embodiments the period of time is 1 ms, 2 ms, 5 ms in the range up to 1 ms, or in the range 1 to 5 ms. In some embodiments the time period is the time for a taken action. In some embodiments the time period is during the activation of a configuration. In some embodiments the time period is during an activation of the RAN radio unit. In some embodiments the time period is continuous.

The power characteristics measurements are paired with an indication of the used configuration thereby providing a power measurement report for the RAN radio unit 120.

In some embodiments the power measurement report is series of power measurements, measured at some sample rate, from the power measurement device 130 and paired with an indication of the used configuration.

The indication of a configuration is in some embodiments the configuration. I.e., the indicated configuration is represented by the entire configuration and all of its content. The indication of a configuration is in some embodiments an identifier for the configuration. The identifier enabling for use of a shorter data field to be transmitted and stored if not all possible configurations are used.

The power measurement report thus indicates the configuration utilized by the RAN radio unit 120 and the measured power over time (i.e. a series of power measurements forming a power curve).

In some embodiments, the RAN radio unit 120 forwards the power measurement report to the baseband unit 140.

In some embodiments, the RAN radio unit 120 forwards the power measurements to the associated baseband unit 140 which in turn generates the power measurement report.

The baseband unit 140 receives multiple power measurement reports from different RAN radio units 120 and in some embodiments these multiple power measurement reports from different RAN radio units 120 are aggregated into an aggregated power measurement report indicating power measurements over time for a configuration. The configuration may be different for different RAN radio units 120 (since different RAN radio units may employ different energy efficient features). In some embodiments, the baseband unit 140 is configured to aggregate power measurement reports for a same configuration into an aggregated power measurement report for that configuration.

In some embodiments, the baseband unit 140 forwards the multiple power measurements to the RAN radio control unit 110.

As the RAN radio control unit 110 receives 420 a power measurement report, alone, along with other power measurement reports or as part of an aggregated power measurement report, the RAN radio control unit 110 determines 430 whether the measured power corresponds to an expected power characteristics for the associated configuration.

In some embodiments, the RAN control unit 110 determines whether the measured power characteristics corresponds to an expected power characteristics for the associated configuration by forwarding the received power measurement report to the server 150, which makes the actual determination.

In order to determine whether the measured power corresponds to an expected power characteristics for the associated configuration, a data library of configurations and associated expected power characteristics are kept in the memory 152 of the server 150 as in the example of FIG. 3.

In some embodiments the determination is based on performing a matching of the measured power characteristics to the expected power characteristics and seeing if the two correlates to one another, and if so determine that there is a match.

In some embodiments the determination is based on a neural network 154 being utilized for identifying which energy efficiency feature is activated based on the measured power characteristics, and determining if the identified energy efficiency features correspond to the configuration indicated in the power measurement report and if so determine that there is a match as in the example embodiments of FIG. 3. In some such embodiments, the neural network is trained to associate power characteristics with one or more Energy Efficiency Features in a configuration. The server is thus further configured to determine whether the measured power characteristics corresponds to the expected power characteristics of the indicated configuration by identifying candidate Energy Efficiency Features based on the measured power characteristics and determining if the candidate Energy Efficiency Features matches the Energy Efficiency Features of any of the one or more stored configurations and if so determine whether the configuration having the matching Energy Efficiency Features is the indicated configuration, and if so determine that the measured power characteristics corresponds to the expected power characteristics of the indicated configuration.

If the determination is a match, the configuration is verified 440 as working. In some embodiments, the configuration is logged as working with a timestamp. This way, valuable data is recorded for surveillance, performance optimizations and troubleshooting of energy efficiency features within the RAN network 100, for local, distributed and centrally controlled features.

If the determination is not a match, the configuration is not verified and (corrective) action is taken 450.

One action is that a warning is indicated that the configuration is not working properly. In response to such a warning, a second configuration may be selected and forwarded to the RAN radio units 120. In some embodiments the second configuration indicates an energy efficiency feature substituting an energy efficiency feature determined to not be working properly.

An alternative or supplemental action, is that the received power measurement report is stored in the data library as the expected power characteristics of the indicated configuration.

In some embodiment, the server 150 is configured to determine a missing or failing energy efficient feature based on the identified energy efficient features and the energy efficient features of the indicated configuration. That a feature is missing may be determined based on there being a mismatch between the measured power characteristics and the expected power characteristics, wherein the mismatch equals or is similar to an energy efficiency function's (expected or associated) contribution to the power characteristics. That a features is failing may be determined based on there being a mismatch between the measured power characteristics and the expected power characteristics, wherein the mismatch is in an energy efficiency function's (expected or associated) contribution to the power characteristics. If there is an energy efficient feature in the configuration that is not identified, that energy efficient feature may be logged as not operating correctly. A further alternative or supplemental action, is that the server determines whether the indicated configuration is stored in the data library or if it is a new unknown configuration, or in other words, a configuration that has not been measured before—or at least not stored in the data library, and if so the indicated configuration is stored in the data library along with the measured power characteristics as the expected power characteristics of the indicated configuration.

The server 150 is, in some embodiments, configured to (re)train the neural network 154 based on the stored configurations and expected power characteristics in the data library as an action. The server 150 is thus configured to (re)train the neural network based on the determination whether the measured power characteristics corresponds to the expected power characteristics of the indicated configuration, thereby providing a (re)training of the neural network 154 based on RAN radio units deployed in the field.

In some embodiments the server 150 is configured to (re)train the neural network 154 on a daily basis. In some embodiments the server 150 is configured to (re)train the neural network 154 on a weekly basis. In some embodiments the server 150 is configured to (re)train the neural network 154 as a corrective action when mismatch has been determined.

In some embodiments the RAN control unit 110 is configured to determine whether a RAN radio unit 120 for which a mismatch has been determined is operating correctly before proceeding with any of the actions discussed above. E.g. a service person may manually verify that a certain energy efficient feature according to a configuration is or is not working as it should.

In some embodiments the server 150 is configured to receive the neural network 154, wherein the neural network is (initially) trained based on power measurements obtained from RAN node radio units used in a laboratory environment.

Returning to FIG. 1, the server 150, is in some embodiments, connected to a laboratory environment 160 for receiving the neural network 154. The connection is indirect in some embodiments, as a skilled person would understand and as is indicated by the dashed lines. In some such embodiments, the server is connected to the laboratory environment 160 by receiving the neural network 154 that has been trained by the laboratory environment 160. The neural network 154 may be received from the laboratory environment 160 either directly from the laboratory environment 160 or from an intermediary.

The laboratory environment 160 is connected to one or more RAN radio units 120, possibly through a baseband unit (not shown). The laboratory environment 160 receives power measurement reports from the RAN radio units 120, stores the power measurements and the indicated configuration and then uses these to train the neural network. The laboratory environment 160 comprises in some embodiments a server 150.

Figure 2F:
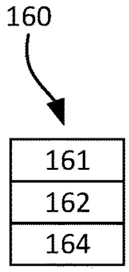
FIG. 2F shows a schematic view of a laboratory environment according to some embodiments of the teachings herein.

FIG. 2F shows a schematic view of a laboratory environment 160 according to some embodiments of the teachings herein. The laboratory environment 160 comprises a controller 161 and a memory 162.

The controller 161 is configured to control the overall operation of the laboratory environment 160. The memory 162 is configured to store configurations, settings and computer-readable instructions that when loaded into the controller 161 indicates how the laboratory environment 160 is to be controlled. The memory 162 is also configured to store a neural network 154 and a library of expected power characteristics for a configuration of energy efficiency features.

The controller 161 is configured to cause the RAN radio units 120 to operate according to a plurality of configurations. Each configuration indicating one or more energy efficiency features to be used. The controller 161 is also configured to cause the RAN radio units 120 to measure the power characteristics of the radio units 120 as they operate, and to measure the power characteristics over time. This builds up a data library of configurations and expected power characteristics for numerous configurations varying which energy efficiency features that are run together. The controller 161 is configured to train the neural network based on this data library, thereby enabling the neural network to associate an energy efficiency feature with an expected power characteristic, which energy efficient feature the neural network hence is able to identify even when being run in combination with many other energy efficiency features.

As the laboratory environment may be controlled to much greater degree than a field environment, there are fewer unknown factors and power characteristics generated in a laboratory environment can thus be assumed to be correct and representing a properly working RAN radio unit. The power characteristics in the laboratory environment thus provide for a good base scenario beneficially used for training.

Returning to FIG. 4, an initial training of the neural network 400 has thus been performed in some embodiments, prior to the neural network being used.

As mentioned in the above, in some embodiments, the server 150 is provided as a cloud service. In some embodiments, the server 150 is provided as one or more dedicated services or servers. In some embodiments, the server 150 is provided as an internal server or software module for the RAN control unit 110. Both the server 150 and the RAN control unit 110 are thus examples of a computing device 110, 150 configured to configured to store one or more configurations along with expected power characteristics for the one or more configurations; receive a power measurement report, wherein the power measurement report indicates one configuration out of the one or more configurations and a corresponding measured power characteristics for a Radio Access Network radio unit 120; determine whether the measured power characteristics corresponds to the expected power characteristics of the indicated configuration, and if so verify the configuration; and if not so issue a warning.

Figure 5:
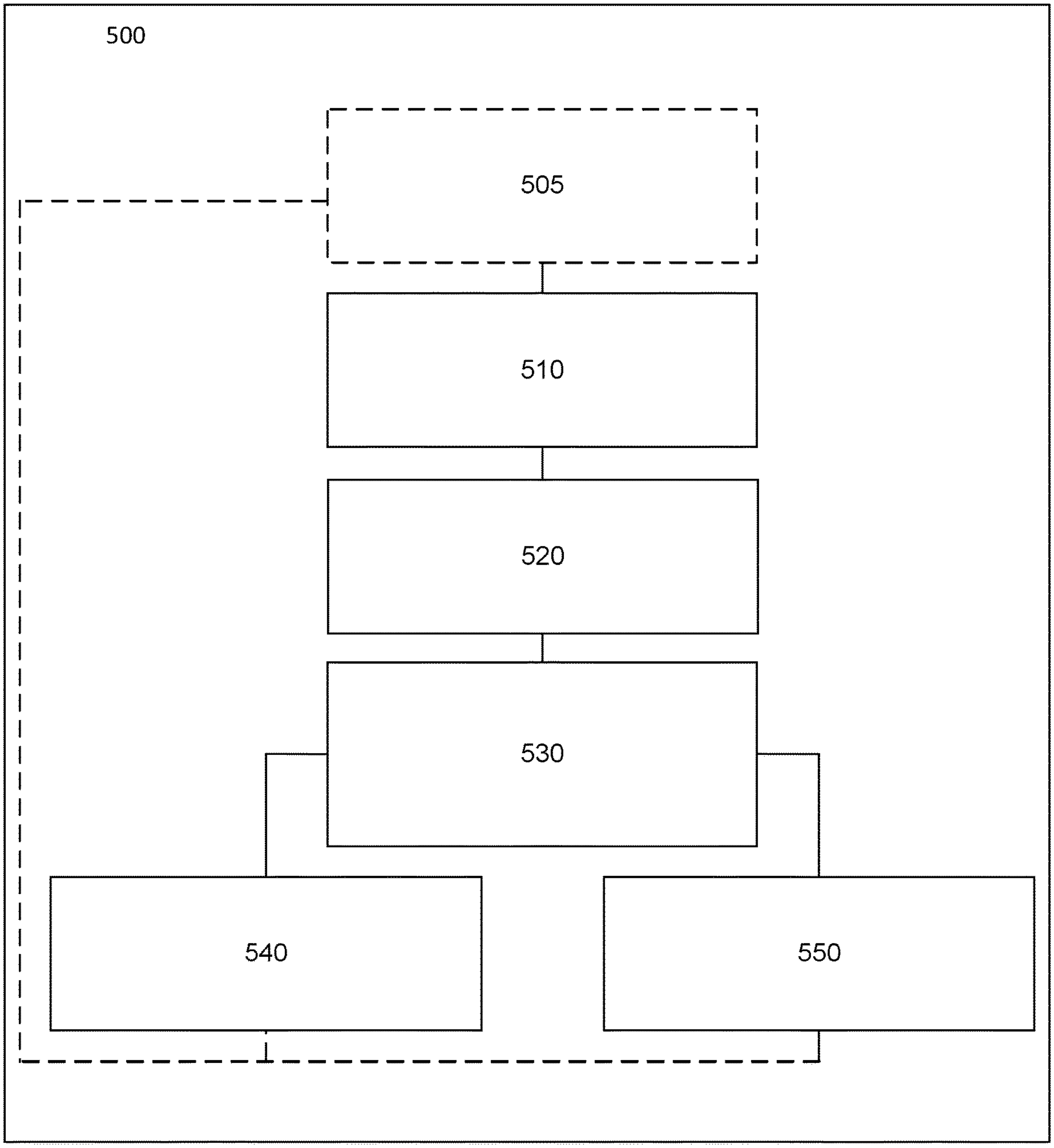
FIG. 5 shows a component view for a software component apparatus according to some embodiments of the teachings herein.

FIG. 5 shows a schematic view of a software component apparatus 500 for a computing device 110,150. The software component apparatus 500 comprises: a first software component 510 for storing one or more configurations along with expected power characteristics for the one or more configurations; a second software component 520 for receiving a power measurement report, wherein the power measurement report indicates one configuration out of the one or more configurations and a corresponding measured power characteristics for a Radio Access Network radio unit 120; a third software component 530 for determining whether the measured power characteristics corresponds to the expected power characteristics of the indicated configuration; a fourth software component 540 for verifying the configuration if the measured power characteristics corresponds to the expected power characteristics of the indicated configuration; and a fifth software component 550 for issuing a warning if the measured power characteristics does not correspond to the expected power characteristics of the indicated configuration.

In some embodiments, the software component apparatus 500 further comprises a sixth software component 505 for training the neural network 154.

As would be understood, the software component apparatus 500 of FIG. 5 may further comprise one or more additional software components for any of the procedures disclosed herein.

Figure 6:
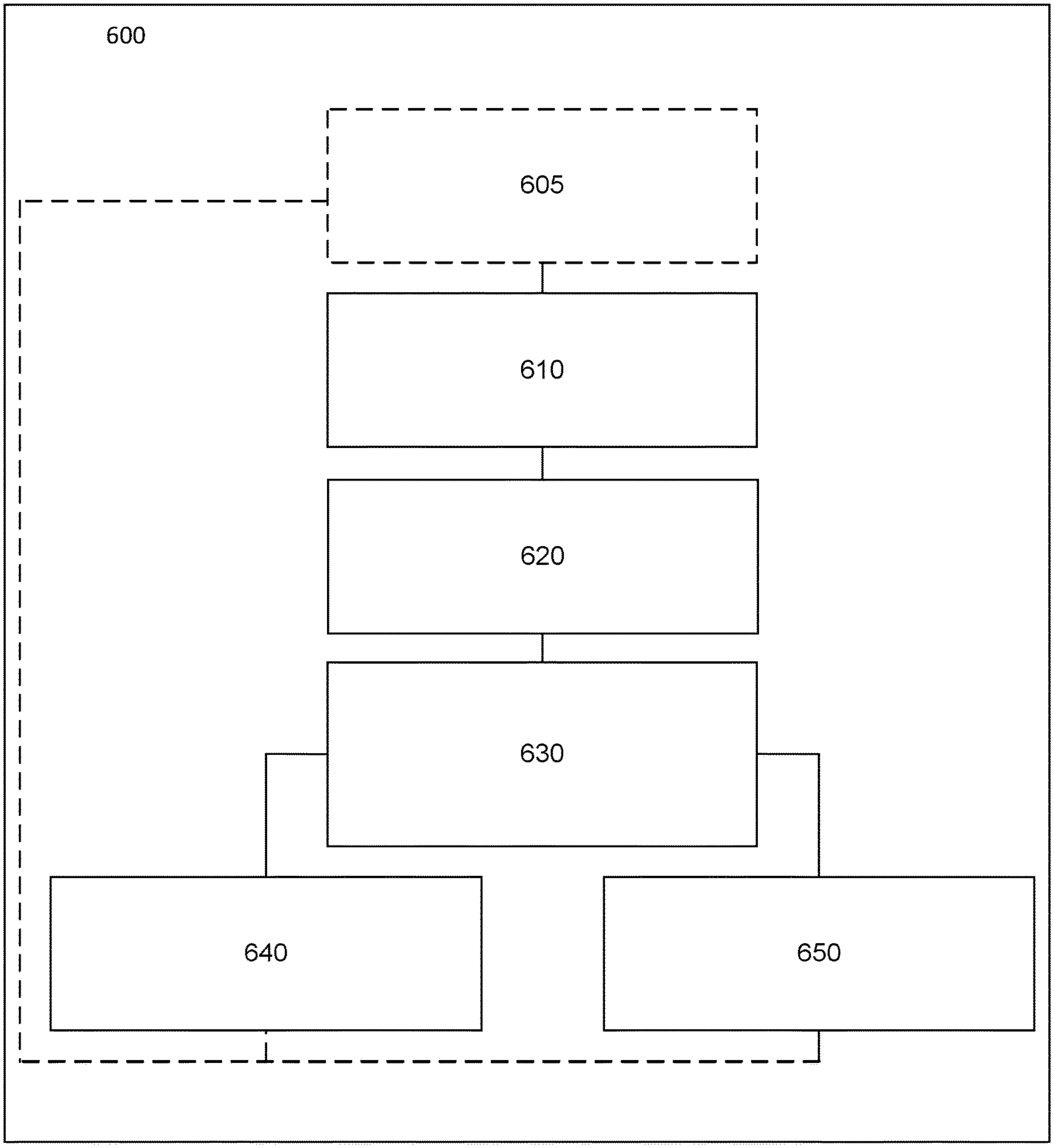
FIG. 6 shows a component view for an apparatus comprising circuits according to some embodiments of the teachings herein.

FIG. 6 shows a schematic view of a computing device 110, 150, 600 comprising: first circuitry 610 for storing one or more configurations along with expected power characteristics for the one or more configurations; second circuitry for receiving 620 a power measurement report, wherein the power measurement report indicates one configuration out of the one or more configurations and a corresponding measured power characteristics for a Radio Access Network radio unit 120; third circuitry 630 for determining whether the measured power characteristics corresponds to the expected power characteristics of the indicated configuration; fourth circuitry 640 for verifying the configuration if the measured power characteristics corresponds to the expected power characteristics of the indicated configuration; and fifth circuitry 650 for issuing a warning if the measured power characteristics does not correspond to the expected power characteristics of the indicated configuration.

In some embodiments, the computing device 600 further comprises a sixth circuitry 605 for training the neural network 154.

As would be understood, the computing device 110, 150, 600 of FIG. 6 may further comprise one or more circuitry for any of the procedures disclosed herein.

Figure 7:
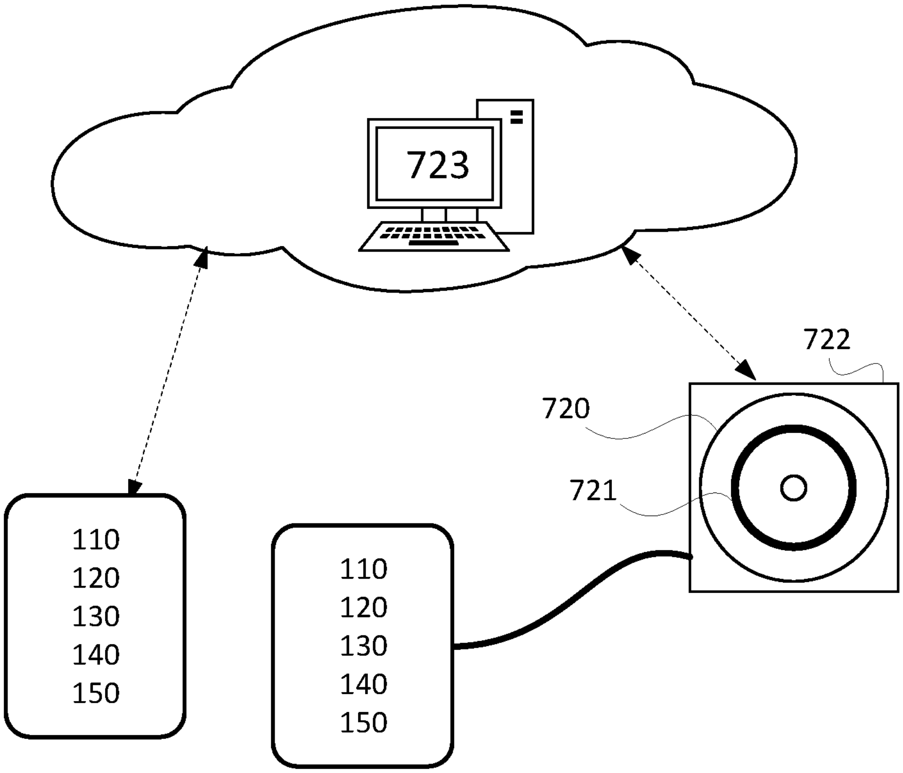
FIG. 7 shows a schematic view of a computer-readable medium carrying computer instructions that when loaded into and executed by a controller of an apparatus enables the apparatus to implement some embodiments of the teachings herein.

FIG. 7 shows a schematic view of a computer-readable medium 720 carrying computer instructions 721 that when loaded into and executed by a controller 111, 121, 131, 141, 151 of a device or unit 110, 120, 130, 140, 150 enables the device or unit 110, 120, 130, 140, 150 to implement the teachings herein. The device or unit may e.g. be any of the RAN control unit 110, RAN baseband unit 140, RAN radio unit 120, power measuring device 130 and server 150 as described in conjunction with any of the previous FIGS. 1-6.

The computer-readable medium 720 may be tangible such as a hard drive or a flash memory, for example a USB memory stick or a cloud server. Alternatively, the computer-readable medium 720 may be intangible such as a signal carrying the computer instructions enabling the computer instructions to be downloaded through a network connection, such as an internet connection.

In the example of FIG. 7, a computer-readable medium 720 is shown as being a computer disc 720 carrying computer-readable computer instructions 721, being inserted in a computer disc reader 722. The computer disc reader 722 may be part of a cloud server 723—or other server—or the computer disc reader may be connected to a cloud server 723—or other server. The cloud server 723 may be part of the internet or at least connected to the internet. The cloud server 723 may alternatively be connected through a proprietary or dedicated connection. In one example embodiment, the computer instructions are stored at a remote server 723 and be downloaded to the memory 112, 122, 132, 142,152 of the device or unit 110, 120, 130, 140, 150 for being executed by the controller 111, 121, 131, 141,151.

The computer disc reader 722 may also or alternatively be connected to (or possibly inserted into) a device or unit 110, 120, 130, 140, 150 for transferring the computer-readable computer instructions 721 to a controller of the device or unit 110, 120, 130, 140, 150 (presumably via a memory of the device or unit 110, 120, 130, 140, 150).

FIG. 7 shows both the situation when a device or unit 110, 120, 130, 140,150 receives the computer-readable computer instructions 721 via a server connection and the situation when another device or unit 110, 120, 130, 140, 150 receives the computer-readable computer instructions 721 through a wired interface. This enables for computer-readable computer instructions 721 being downloaded into a device or unit 110, 120, 130, 140, 150 thereby enabling the device or unit 110, 120, 130, 140, 150 to operate according to and implement the invention as disclosed herein.

The invention claimed is:

1. A computing device comprising:
- memory storing one or more configurations; and
- a controller connected to the memory, wherein the controller is configured to perform a method comprising:
- receiving a power measurement report indicating one configuration out of the one or more configurations and a corresponding measured power characteristics for a radio access network (RAN) radio unit;
- determining whether the measured power characteristics corresponds to expected power characteristics associated with the indicated configuration; and
- issuing a warning in response to determining that the measured power characteristics does not correspond to the expected power characteristics associated with the indicated configuration, wherein
- determining whether the measured power characteristics corresponds to expected power characteristics associated with the indicated configuration comprises:
  - comparing the measured power characteristics to the expected power characteristics associated with the indicated configuration, or
  - comparing an energy efficiency feature associated with the measured power characteristics with an energy efficiency feature associated with the indicated configuration.

2. The computing device of claim 1, wherein
- determining whether the measured power characteristics corresponds to the expected power characteristics associated with the indicated configuration comprises:
  - utilizing a neural network to obtain an energy efficiency feature associated with the measured power characteristics; and
  - comparing the energy efficiency feature associated with the measured power characteristics with an energy efficiency feature associated with the indicated configuration.

3. The computing device of claim 2, wherein the controller is further configured to retrain the neural network based on the determination whether the measured power characteristics corresponds to the expected power characteristics associated with the indicated configuration.

4. The computing device of claim 2, wherein the controller is configured to receive the neural network.

5. The computing device of claim 4, wherein the neural network is trained based on power measurements obtained from RAN node radio units used in a laboratory environment.

6. The computing device of claim 1, wherein
- the controller is further configured to store the measured power characteristics as the expected power characteristics associated with the indicated configuration in response to determining that the measured power characteristics does not correspond to the expected power characteristics associated with the indicated configuration.

7. The computing device of claim 1, wherein
- the controller is further configured to:
  - determine whether the indicated configuration is not stored in the memory, and if so,
  - store the indicated configuration in the memory along with the measured power characteristics as the expected power characteristics associated with the indicated configuration in response to determining that the measured power characteristics does not correspond to the expected power characteristics associated with the indicated configuration.

8. The computing device of claim 1, wherein
- the controller is further configured to:
  - select a new configuration from the one or more stored configurations for the RAN radio unit in response to determining that the measured power characteristics does not correspond to the expected power characteristics associated with the indicated configuration.

9. The computing device of claim 1, wherein the power measurement report is an aggregated power measurement report for a plurality of RAN radio units.

10. A server comprising the computing device of claim 1.

11. The server of claim 10, wherein the server is comprised in a cloud service.

12. A radio access network (RAN) radio control unit comprising a second controller, the RAN radio control unit being connected to or comprising the computing device of claim 1, and wherein
- the second controller is configured to receive the power measurement report and forward it to the computing device.

13. The RAN radio control unit of claim 12, wherein the second controller is configured to receive the power measurement report from a RAN baseband unit and forward it to the computing device.

14. The RAN radio control unit of claim 12, wherein the controller of the computing device is the second controller.

15. A radio access network (RAN) baseband unit comprising:
- a controller, wherein the controller is configured to:
  - receive a plurality of power measurements for one or more RAN radio units for a configuration utilized by the one or more RAN radio units;
  - aggregate the plurality of power measurements into an aggregated power measurement report; and
  - transmit the aggregated power measurement report to a RAN radio control unit.

16. A radio access network (RAN) radio unit comprising:
- a power amplifier; and
- a controller, wherein the controller is configured to perform a method comprising:
- measuring a plurality of power characteristics of the RAN radio unit during a time period; and transmitting the plurality of power characteristics of the RAN radio unit as a measured power characteristics to a RAN baseband unit, wherein measuring the plurality of power characteristics of the RAN radio unit during the time period comprises:

measuring a power of the power amplifier at time intervals.

17. A method comprising:

storing one or more configurations receiving a power measurement report indicating one configuration out of the one or more configurations and a corresponding measured power characteristics for a radio access network (RAN) radio unit;

determining whether the measured power characteristics corresponds to expected power characteristics associated with the indicated configuration; and issuing a warning in response to determining that the measured power characteristics does not correspond to the expected power characteristics associated with the indicated configuration, wherein determining whether the measured power characteristics corresponds to the expected power characteristics associated with the indicated configuration comprises:

comparing the measured power characteristics to the expected power characteristics associated with the indicated configuration, or comparing an energy efficiency feature associated with the measured power characteristics with an energy efficiency feature associated with the indicated configuration.

18. A non-transitory computer-readable storage medium storing computer instructions that when loaded into and executed by a controller of a computing device enables the computing device to implement the method of claim 17.

* * * * *